(12) United States Patent
Redfearn et al.

(10) Patent No.: US 6,958,090 B2
(45) Date of Patent: Oct. 25, 2005

(54) PIGMENTED INKS FOR INK JET PRINTERS

(75) Inventors: Graham Redfearn, Winsford (GB);
Peter Edward Rose, Winsford (GB);
Nicholas Alexander Walker, Congleton (GB)

(73) Assignee: ILFORD Imaging Switzerland GmbH (CH)

( * ) Notice: Subject to any disclaimer, the term of this patent is extended or adjusted under 35 U.S.C. 154(b) by 0 days.

(21) Appl. No.: 10/327,274

(22) Filed: Dec. 20, 2002

(65) Prior Publication Data

US 2003/0145761 A1 Aug. 7, 2003

(30) Foreign Application Priority Data

Dec. 22, 2001 (GB) ............................................. 0130897

(51) Int. Cl.⁷ ......................... C09D 11/02; G01D 11/00
(52) U.S. Cl. .................... 106/31.6; 106/31.9; 106/476; 347/100
(58) Field of Search ............................. 106/31.6, 31.9, 106/476; 347/100

(56) References Cited

U.S. PATENT DOCUMENTS

| | | | | |
|---|---|---|---|---|
| 5,416,145 A | * | 5/1995 | Askeland et al. | 524/83 |
| 5,609,671 A | | 3/1997 | Nagasawa | |
| 5,803,958 A | * | 9/1998 | Katsen et al. | 106/31.65 |
| 6,187,086 B1 | * | 2/2001 | Rehman | 106/31.86 |
| 6,203,605 B1 | | 3/2001 | Thakkar et al. | |
| 6,387,168 B1 | * | 5/2002 | Koitabashi et al. | 106/31.6 |
| 6,440,203 B2 | * | 8/2002 | Kato | 106/31.6 |
| 6,518,370 B2 | * | 2/2003 | Abuelyaman et al. | 525/437 |
| 6,530,986 B2 | * | 3/2003 | Walker et al. | 106/31.6 |
| 6,558,753 B1 | * | 5/2003 | Ylitalo et al. | 427/466 |
| 6,648,953 B2 | * | 11/2003 | Yamazaki et al. | 106/31.68 |
| 2002/0017219 A1 | * | 2/2002 | Yamazaki et al. | 106/31.68 |
| 2002/0118265 A1 | | 8/2002 | Rose et al. | |
| 2003/0134938 A1 | * | 7/2003 | Nakamura et al. | 523/160 |

FOREIGN PATENT DOCUMENTS

| | | |
|---|---|---|
| EP | 0 751 194 A2 | 1/1997 |
| EP | 0 899 311 A1 | 3/1999 |
| EP | 1 114 851 A1 | 1/2001 |
| EP | 0 899311 B1 | 11/2002 |
| WO | WO 97/23575 | 7/1997 |

OTHER PUBLICATIONS

Colour Index International, Pigments and Solvent Dyes, published by the Society of Dyers and Colourists 1997, no month available.

* cited by examiner

Primary Examiner—J. A. Lorengo
Assistant Examiner—Veronica F. Faison
(74) Attorney, Agent, or Firm—Dara L. Onofrio, Esq.; Onofrio Law

(57) ABSTRACT

There is provided an aqueous ink jet ink composition suitable for use in continuous ink jet printers comprising:
(a) a surface modified carbon black pigment;
(b) at least one organic pigment; and
(c) an aqueous carrier medium.

The black aqueous pigment ink formulated in accordance with this composition provides a dried ink film whereof the resistivity is increased to a level whereby no printer failure or print defects are caused by electrical shorts when the printer has been out of use for a sufficient time to allow the ink to dry out in parts of the apparatus. The ink may also comprise at least one dispersant for the organic pigment.

17 Claims, No Drawings

PIGMENTED INKS FOR INK JET PRINTERS

FIELD OF THE INVENTION

This invention relates to improved black pigmented ink jet inks, and in particular to a black ink jet ink suitable for use in continuous ink jet printers.

BACKGROUND OF THE INVENTION

Ink jet printing is a non-impact method that in response to a digital signal produces droplets of ink that are deposited on a substrate such as paper or transparent film. Ink jet printers have found broad application as output for personal computers in the office and the home. There are several classes of ink jet printer, for instance thermal drop-on-demand printers, piezo drop-on-demand printers, and continuous ink jet printers.

Continuous ink jet recording has several advantages in that it produces low noise and can obtain a high-resolution recorded image at a high speed by utilising a highly integrated head. It is common to use a solution obtained by dissolving one or more water-soluble dyes in water or a solvent mixture of water and an organic solvent as the ink for such an ink jet recording method. In addition to the properties required of the ink for good printing performance, there are other requirements affecting the start up of the printing apparatus after it has been turned off for any length of time. For example, firstly, any ink which dries on the orifice plate or other surfaces should redissolve rapidly when the apparatus is restarted, and secondly, it is also important that the dried ink film should have adequate electrical resistivity to prevent shorting out electrodes in the system when an attempt is made to restart the printhead. Current state-of-the-art aqueous ink jet inks which utilize water soluble dyes achieve acceptable performance in these respects.

Several suitable water soluble dyes which have been perfected for ink jet use are known, but there are some deficiencies to the use of these dyes. For instance they remain soluble in water on the printed page and are therefore subject to print defects such as feathering and to blurring and leaching by water, for example rain water and coffee. Furthermore, many of the dyes in use have poor light fastness and fade even on exposure to fluorescent lighting used in offices.

Consequently there is interest in the use of a black pigment such as carbon black in inks for continuous ink jet printers. The term pigment describes a colorant which is substantially insoluble in the aqueous ink medium. It is expected that prints produced using a pigmented ink will display better light stability and also improved fastness to washing and weathering as the pigment is dispersed rather than dissolved.

However the use of pigments rather than dyes creates some complications in the use of the ink. For instance, redispersion rather than redissolvability must be achieved to have good system start-up. In addition, pigmented black inks based on carbon black dry down to provide films which are electrically conductive, presumably due to the interparticle contact at the bare carbon particle surface. This means that when a continuous ink jet printhead is shut down, the films formed from the dried inks on surfaces in the apparatus tend to short out electrodes in the system and that start up performance is poor.

Thus there is a need to increase the electrical resistivity of dried ink films from pigmented black inks. To a certain extent the problem may be overcome by reducing the concentration of the black pigment, but the density of the printed image then becomes inferior to that of the image printed by using a dyed ink and also the image tends to become brown shaded or warm toned. Although under certain circumstances toned images may be desired, a neutral or nearly neutral shade is normally preferred. Further, it is known according to U.S. Pat. No. 5,609,671 that the use of inks incorporating dispersions prepared from surface treated or chemically modified black pigments will increase the electrical resistivity of dried ink films. However this is normally insufficient to overcome the problem. Furthermore, it is also known that the addition of various polymers to pigmented inks will increase the dried ink film resistance. For instance U.S. Pat. No. 6,203,605 discloses an ink jet ink composition comprising a liquid vehicle, a chemically modified pigment dispersion, and also incorporating a polymer to provide a synergistic effect in increasing the dried ink film resistance values. However the amount of polymer which may be added to the ink is limited as the viscosity is otherwise excessive for satisfactory use.

It is seen then that there is a need for an improved pigment based black ink suitable for use in continuous ink jet printers. We have developed an ink formulation which provides acceptably resistive dried ink films for use in continuous ink jet printers.

European Patent Application 0 899 311 A discloses use of a combination of carbon black with an organic pigment in an ink jet ink. U.S. Pat. No. 5,803,958 discloses use of carbon black in combination with cyan and magenta pigments. However neither of the patents disclose inks that are used in continuous ink jet printers nor do they disclose the use of surface treated carbon black with an organic pigment.

SUMMARY OF THE INVENTION

In the present invention, these purposes, as well as others which will be apparent, are achieved generally by providing an ink jet composition comprising a surface modified carbon black pigment; at least one organic pigment; and an aqueous carrier medium. The ratio of black pigment to the organic pigment is between 10:1 and 1:2 and depends on the particular organic pigment, the grade and type of the black ink, the ink formulation and the printing medium.

Other objects, features, and advantages of the present invention will become apparent from the following detailed description of the invention.

DETAILED DESCRIPTION OF THE INVENTION

According to this invention there is provided an aqueous ink jet ink composition comprising:

(a) a surface modified carbon black pigment;
(b) at least one organic pigment; and
(c) an aqueous carrier medium.

The term pigment describes a colorant which is essentially insoluble in the aqueous ink medium. Carbon black is listed in the Pigments and Solvent Dyes section of the Colour Index International, published by the Society of Dyers and Colorists in 1997 as C.I. Pigment Black 7. Examples include furnace black, lamp black, acetylene black, and channel black. By a surface modified carbon black is meant a carbon black pigment, the particles of which have been modified by incorporation of organic groups at the surface such as, for example, carboxylic or sulphonic acid groups. Such chemically modified carbon black pigments are known and commercially available from suppliers such as Cabot Corporation and Orient Corporation, and may include so-called self dispersing carbon black and graft carbon black pigments.

Suitable organic pigments may include almost any insoluble colored organic compound. Many such compounds are described in the book Industrial Organic Pigments by W. Herbst and K. Hunger, 2nd edition published by VCH Weinheim in 1997. Suitable pigments include those classified by the Color Index as C.I. Pigment Black 1; C.I. Pigment Yellow 1, 3, 12, 13, 14, 17, 24, 55, 74, 81, 83, 87, 95, 97, 98, 100, 101, 104, 108, 109, 110, 117, 120, 138, 151, 154, 155 and 180; C.I. Pigment Orange 5, 13, 16, 17, 36, 43, and 51; C.I. Pigment Red 1, 2, 3, 9, 17, 22, 23, 31, 38, 48:1, 48:2, 48:3, 48:4, 49:1, 52:2, 53:1, 57:1, 60:1, 63:1, 63:2, 64:1, 81, 83, 88, 112, 114, 122, 123, 146, 149, 166, 168, 170, 172, 177, 178, 179, 184, 188, 190, 202, and 209; C.I. Pigment Violet 1, 3, 5:1, 19, 23, 35, and 37; C.I. Pigment Blue 1, 2, 15:1, 15:2, 15:3, 15:4, 15:6, 16, 56, 60, 76,79, and 80; and C.I. Pigment Green 1, 4, 7, 8, 10, and 36. Preferably the pigment is a blue pigment or a violet pigment, and most preferably it is selected from Copper Phthalocyanine pigments, for example C.I. Pigment Blue 15:1, 15:2, 15:3, 15:4, and 15:6, dioxazine pigments, for example C.I. Pigment Blue 80, and indanthrone pigments, for example C.I. Pigment Blue 60. Pigment Blue 60 is especially preferred. It is also possible to mix more than one organic pigment in the inks of the invention.

The pigment may be used in the form of a dry powder. However organic pigments are often supplied commercially as a concentrated aqueous pigment dispersion, and this invention is also useful for pigments supplied as such dispersions, which commonly include dispersants and other cosolvents as well as water. Alternatively the pigment may be supplied in the form of a water wet presscake. In presscake form, the pigment is not aggregated to the extent that it is in dry form and thus the pigment does not require as much deaggregation in the process of preparing the inks from dry pigments. Further, self dispersing organic pigments and grafted organic pigments may also be used in the inks of the invention.

The total pigment concentration of the ink may be up to approximately 30% by weight, but will generally be between about 1% and about 15%, preferably approximately 3 to 8%, by weight of the total ink composition. The ratio of the black pigment to the organic pigment may be between 10:1 and 1:2, preferably between approximately 2:1 and approximately 1:1, by weight. The ratio depends on the particular organic pigment, the grade and type of the black pigment, the ink formulation, and the printing medium. By appropriate choice of the organic pigment or pigments and the ratio between the organic pigment and carbon black it is possible to obtain prints of pleasant neutral tones. In addition to providing neutral toned prints, controlled warm or cold toned prints may be produced by appropriate choice of the pigments and the ratio between the organic pigment and carbon black.

By an aqueous carrier medium is meant a medium which is water or is predominantly water, but may also comprise one or more water soluble organic cosolvent. Deionised water is commonly used. The ink composition may contain up to 50% of the organic cosolvent or mixture of organic cosolvents, but preferably the ink comprises less than 10% organic cosolvent, and most preferably substantially no organic cosolvent is present in the ink.

The water soluble organic cosolvent may be any organic solvent which has sufficient solubility in water. Preferred examples of water-soluble organic solvents that may be selected include nitrogen containing organic compounds such as 1,3-dimethyl imidazolidinone, urea, pyrrolidone and N-methyl-2-pyrrolidone and hydroxylic organic solvents, especially solvents having at least 2 hydroxyl groups; for example diethylene glycol, triethylene glycol, polyethylene glycol, thiodiglycol, glycerol, 1,2-hexanediol, 1,5-pentanediol, and mixtures comprising these solvents.

Optionally and preferably the ink may also comprise at least one dispersant for the organic pigment. The purpose of the dispersant is to stabilise the particles and prevent flocculation, aggregation, and settling of the ink. Suitable dispersants for pigmented ink jet inks are well known in the art, and include polymeric dispersants as well as some non-polymeric compounds of the surfactant type. Suitable dispersants for the inks of this invention include macromolecular polyionic dispersants, for example copolymers of styrene with acrylic, methacrylic, or maleic acids; various types of poly(ethylene oxide) condensates such as alkyl polyethylene oxide ethers and sulfate or phosphate esters thereof; and surfactants such as sarcosinate compounds. There may be present up to 400% of the dispersant by weight on the pigment, but preferably between about 10% and about 100% by weight on the pigment, and most preferably approximately 20 to 50% by weight on the pigment, depending on the pigment used and other properties desired of the ink.

A preferred dispersant is a styrene/acrylate copolymer, by which is meant a copolymer comprising styrene or a substituted styrene; acrylic, methacrylic, or maleic acids; and optionally with additional vinylically unsaturated comonomers such as acrylate esters. Preferably this dispersant is characterized by an acid number of between about 150 and about 250, a glass transition temperature between about 70° C. and about 100° C., and a molecular weight of between about 2000 and about 20000, and most preferably the acid number is between 150 and 200 and the molecular weight is approximately 5000–15000. Many suitable styrene acrylate dispersants are commercially available. Such styrene acrylate copolymer dispersants may be supplied commercially in the form of concentrated solutions in aqueous base, or as solids which are to be dissolved in water in the presence of a base. Suitable bases for dissolving such dispersants include sodium or potassium hydroxide, ammonia, or an organic amine base such as ethanolamine, diethanolamine, triethanolamine, dimethylaminoethanol, 1-(dimethylamino)-2-propanol, or 2-amino-2-methyl-1-propanol. It is also possible to use mixtures of such bases to dissolve the styrene acrylate copolymer.

The pH of the ink may be controlled by the quantity of base added to the dispersant or by appropriate addition of acid or base to the final ink. Generally the pH of the ink is between about 7 and about 11.5, typically between approximately 8.5 and 10.

The pigmented inks of the invention may also comprise other components which are advantageously added to aqueous ink jet inks, such as surfactants, viscosity modifiers, and biocides. In addition, sequestering agents such as EDTA may also be included to eliminate deleterious effects of heavy metal impurities. The surface tension may be adjusted by appropriate addition of surfactant to be about 20 dyne/cm or greater. For printing on plain paper the surface tension is preferably at least about 40 dyne/cm and most preferably at least about 50 dyne/cm, depending on the printer and other criteria. The viscosity is generally no greater than 10 cP, preferably between about 1 cP and about 2 cP. One of the advantages of the invention is the desirably low viscosity of the inks.

It is generally desirable to prepare a concentrated dispersion by dispersing the pigment in water in the presence of one or more dispersants, and then to dilute this dispersion with additional water together with any other additives to form the ink. This technique permits preparation of a greater quantity of pigmented ink from the equipment. The inks of the invention may either be prepared by dispersing the pigments separately and then combining them at dilution, or by dispersing a combination of the pigments. By dilution, the ink is adjusted to provide the desired concentration, color strength, and other properties for the particular application. The dispersing step may be accomplished by many well known methods, for example in a horizontal mini mill, a ball mill, a roll mill, an attritor, a homogeniser or by passing the mixture through a plurality of nozzles within a liquid jet interaction chamber at a liquid pressure of at least 1000 psi to produce a uniform dispersion of the pigment particles in the aqueous carrier medium.

A suitable average particle size of the pigment is 10 μm or less, preferably 1 μm or less and most preferably from 0.005 to 0.3 μm.

In another embodiment of the present invention, there is provided a process of printing using the ink of the invention. The printing is effected by using the ink in a continuous ink jet printer, and applying the ink to a printing medium which can be any of the substrates commonly used for ink-jet printing, for example so-called plain paper, coated paper, wet strength paper, fine art paper, canvas, self-adhesive vinyl, scrim vinyl, overhead transparencies, fabrics, and synthetic media such as white polyester and bonded non-woven polyolefin film-fibril sheets such as polyethylene or polypropylene banner materials. The inks of the invention produce pleasing high quality images of good image tone and high maximum density. Furthermore the prints exhibit excellent lightfastness.

The stability of the ink formulation also allows long storage periods without any loss of printability.

The following examples will serve to illustrate the invention. These examples are merely representative and are not inclusive of all the possible embodiments of the invention.

EXAMPLE 1

In this example, a comparison ink prepared with a conventional carbon black pigment is compared with an ink using a surface modified black pigment alone, with an inventive ink prepared using a combination of modified black pigment and an organic pigment, and with a control ink using organic pigment alone. A comparative black pigment dispersion 1 according to the composition shown in Table 1 was prepared using a Microfluidiser Model M210C at 30,000 psi. The dispersion was then centrifuged to remove oversized particles. A commercial sample of a conventional Carbon Black pigment was used available from Degussa-Hüls under the trade name Black S170. The dispersant used was a commercially available styrene acrylate copolymer having an acid number of 215, a Tg of 95° C. and a molecular weight of 7000 to 9000 neutralized with potassium hydroxide. This dispersant is available from SC Johnson Polymers.

TABLE 1

| Component | % by weight |
|---|---|
| Carbon Black Pigment | 10 |
| Dispersant | 2 |
| Deionised Water to make | 100 |

The average particle size of the dispersion was less than 200 nm.

The black dispersion 2 for the inventive ink consisted of a commercially available dispersion from Cabot Corporation containing 15% of a carbon black pigment, surface modified with carboxyl groups.

A blue pigment dispersion 3 according to the composition shown in Table 2 was prepared using a Microfluidiser Model M110 at 12000 psi. A commercial sample of C.I. Pigment Blue 60 from Dainippon Ink and Chemicals under the trade name Fastogen Super Blue 6070S was used. The dispersant used was the same as for the black dispersion 1, neutralized with potassium hydroxide. The dispersion was then centrifuged at 3000 rpm for 20 minutes to remove oversized particles.

TABLE 2

| Component | % by weight |
|---|---|
| Pigment Blue 60 | 10 |
| Dispersant | 2 |
| Deionised Water to make | 100 |

Preparation of Inks

Inks were prepared using the components listed in Table 3 by diluting the appropriate quantity of dispersion with deionised water where necessary to give a final total pigment loading of 5% in all cases. All parts are measured by weight. Approximately 0.2% of a fluorinated surfactant commercially available under the trade name Zonyl FSO was added to all inks to give a surface tension of about 25 dynes/cm, and the pH was adjusted to 8.5 when necessary by appropriate addition of potassium hydroxide.

The resistivity of dried ink films was determined by drawing the inks down a cellulose triacetate sheet, allowing the inks to dry, and measuring the surface resistivity of the dried ink film between a pair of electrodes using a 'Megger' Megohmmeter. A test voltage of 500 volts was applied across two electrodes each 60 mm long held parallel and 15 mm apart in contact with the surface of the dried ink. The resistance was measured, and the surface resistivity in ohms/square, r, calculated from resistance, R using the formula:

$$r = \frac{R \times l}{d}$$

Where l=electrode length; and d=distance between electrodes. The results are given in Table 3. Under these conditions, an acceptable minimum resistivity is approximately $10^6$ ohms/square, preferably between about $10^6$ and about $10^9$ ohms/square. It is seen that the resistivity of the comparison black ink containing a conventional carbon black pigment 1 and that of the control black ink 4 containing a surface treated black pigment were too low to measure and unacceptable, but that the inventive ink 3 and comparison blue ink 2 are acceptable. The drawdown of the inventive ink 3 was of a dense neutral black shade.

TABLE 3

| Component | % by Weight | | | |
|---|---|---|---|---|
| | Ink 1 Comparison | Ink 2 Comparison | Ink 3 Invention | Ink 4 Control |
| Black pigment dispersion 1 | 50 | | | |
| Black pigment dispersion 2 | | | 16.7 | 33.3 |
| Blue pigment dispersion 3 | | 50 | 25 | |
| Deionised Water to make | 100 | 100 | 100 | 100 |
| Resistivity ohms/square | <1 × 10$^5$ | 2.2 × 10$^8$ | 3.1 × 10$^6$ | <1 × 10$^5$ |

EXAMPLE 2

A blue pigment dispersion 4 according to the composition shown in Table 4 was prepared using a Microfluidiser Model M110 at 12000 psi. A commercial sample of C.I. Pigment Blue 15:3 from Clariant under the trade name Hostaperm Blue B2G02 was used. The dispersant used was a the same as for the black dispersion 1, neutralized with potassium hydroxide. The dispersion was then centrifuged at 3000 rpm for 20 minutes to remove oversized particles.

TABLE 4

| Component | % by weight |
|---|---|
| Pigment Blue 15:3 | 10 |
| Dispersant | 2 |
| Deionised Water to make | 100 |

The black dispersion 5 consisted of a commercially available dispersion from Cabot Corporation containing 20% of a carbon black pigment, surface modified with sulphonic acid groups.

Preparation of Inks

Inks were prepared using the components listed in table 5 by diluting the appropriate quantity of dispersion with deionised water to give a final total pigment loading of 5% in both cases. Approximately 0.2% of a fluorinated surfactant commercially available under the trade name Zonyl FSO was added to all inks to give a surface tension of about 25 dynes/cm, and the pH was adjusted to 8.5 when necessary by appropriate addition of potassium hydroxide. The resistivity of dried ink films was determined as in Example 1, and the results are given in Table 5. It will be seen that both the inventive inks give acceptable resistivity.

TABLE 5

| Component | % by Weight | |
|---|---|---|
| | Ink 5 Invention | Ink 6 Invention |
| Black pigment dispersion 5 | 12.5 | 12.5 |
| Blue pigment dispersion 4 | 25 | |
| Blue pigment dispersion 3 | | 25 |
| Deionised Water to make | 100 | 100 |
| Resistivity ohms/square | 3.0 × 10$^6$ | 1.92 × 10$^6$ |

EXAMPLE 3

The black dispersion 6 consisted of a commercially available dispersion from Orient Corporation of America containing 20% of a carbon black pigment, surface modified with a combination of lactone and carboxylic acid groups.

Preparation of Inks

Inks were prepared using the components listed in table 6 by diluting the appropriate quantity of dispersion with deionised water to give a final total pigment loading of 5% in both cases. Approximately 0.2% of a fluorinated surfactant commercially available under the trade name Zonyl FSO was added to all inks to give a surface tension of about 25 dynes/cm, and the pH was adjusted to 8.5 when necessary by appropriate addition of potassium hydroxide. The resistivity of dried ink films was determined as in Example 1, and the results are given in Table 6. It will be seen that both the inventive inks give acceptable resistivity.

TABLE 6

| Component | % by Weight | |
|---|---|---|
| | Ink 7 Invention | Ink 8 Invention |
| Black pigment dispersion 6 | 12.5 | 2.5 |
| Blue pigment dispersion 4 | 25 | |
| Blue pigment dispersion 3 | | 25 |
| Deionised Water to make | 100 | 100 |
| Resistivity ohms/square | 3.96 × 10$^7$ | 1.66 × 10$^7$ |

EXAMPLE 4

Further blue pigment dispersions were prepared exactly as described for blue dispersions 3 and 4 using the additional commercial pigments listed in Table 7.

TABLE 7

| Dispersion | C. I. Pigment | Supplier; trade name |
|---|---|---|
| 7 | Blue 60 | Ciba; Chromophthal Blue A3R |
| 8 | Blue 60 | Ciba; Irgazin Blue A3RN |
| 9 | Blue 60 | Clariant; Hostaperm Blue RL01 |
| 10 | Blue 15:1 | Clariant; Hostaperm Blue A4R |
| 11 | Blue 61 | Clariant; Reflex Blue R54 |

A violet pigment dispersion 12 according to the composition shown in Table 8 was prepared using a Microfluidiser Model M110 at 12000 psi. A commercial sample of C.I. Pigment Violet 23 from Clariant under the trade name Hostaperm Violet RL-NF was used.

The dispersant used was a commercially available styrene acrylate copolymer having an acid number of 190 and a Tg of 70° C. neutralized with potassium hydroxide. This dispersant is available from BF Goodrich. The dispersion was then centrifuged at 3000 rpm for 20 minutes to remove oversized particles.

TABLE 8

| Component | % by weight |
|---|---|
| Pigment Violet 23 | 10 |
| Dispersant | 0.15 |
| Deionised Water to make | 100 |

Preparation of Inks

Inks were prepared as in the previous examples using the components listed in Table 9, except that the surface tension was not adjusted by the fluorinated surfactant. Ink 1a is the same as ink 1 but without the fluorinated surfactant.

Dried ink films were made by drawdown on plain paper, the resistivity was determined as in Example 1, and the results are given in Table 9. It will be seen that the comparison ink gives a drawdown which is unacceptably conductive, the control ink is marginally acceptable, and that the inventive inks provide acceptable resistivity.

TABLE 9

| Component | Ink 1a Comparison | Ink 9 Control | Ink 10 Invention | Ink 12 Invention | Ink 13 Invention | Ink 14 Invention | Ink 15 Invention | Ink 16 Invention |
|---|---|---|---|---|---|---|---|---|
| | | | % by Weight | | | | | |
| Black dispersion 1 | 50 | | | | | | | |
| Black dispersion 6 | | 25 | 12.5 | 12.5 | 12.5 | 12.5 | 12.5 | 12.5 |
| Blue dispersion 7 | | | 25 | | | | | |
| Blue dispersion 8 | | | | 25 | | | | |
| Blue dispersion 9 | | | | | 25 | | | |
| Blue dispersion 10 | | | | | | 25 | | |
| Blue dispersion 11 | | | | | | | 25 | |
| Violet dispersion 12 | | | | | | | | 25 |
| Deionised Water to | 100 | 100 | 100 | 100 | 100 | 100 | 100 | 100 |
| Resistivity ohms/square | <1 × $10^5$ | 1.76 × $10^6$ | 1.68 × $10^7$ | 1.2 × $10^7$ | 1.32 × $10^7$ | 9.2 × $10^6$ | 1.08 × $10^7$ | 1.32 × $10^7$ |

EXAMPLE 5

Yellow, Magenta and Cyan pigment dispersions 13, 14 and 15 according to the compositions shown in Table 10 were prepared using a Microfluidiser Model M210C at 30000 psi. The dispersions were then centrifuged to remove oversized particles. Commercial samples of C.I. Pigment Yellow 155 from Clariant under the trade name Novoperm Yellow 4G, CI Pigment Red 122 from Ciba under the trade name Cromophtal Pink PT and CI Pigment Blue 15:3 from Clariant under the trade name Hostaperm Blue B2G02 were used. The dispersant used in all cases was a the same as for the black dispersion 1, neutralized with potassium hydroxide.

TABLE 10

| Dispersion | Component | % by weight | | |
|---|---|---|---|---|
| 13 | Pigment Yellow 155 | 10 | | |
| 14 | Pigment Red 122 | | 10 | |
| 15 | Pigment Blue 15:3 | | | 10 |
| | Dispersant | 0.2 | 0.2 | 0.2 |
| | Deionised Water to make | 100 | 100 | 100 |

Preparation of Inks

Inks were prepared as in example 3 using the components listed in Table 12. Dried ink films were made by drawdown on plain paper, the resistivity was determined as in Example 1, and the results are given in Table 11. It will be seen that the inventive ink provides acceptable resistivity. The drawdown of the inventive ink was of a dense neutral black shade.

TABLE 11

| Component | % by Weight Ink 17 Invention |
|---|---|
| Black dispersion 6 | 12.5 |
| Yellow dispersion 12 | 8.3 |
| Magenta Dispersion 13 | 8.3 |
| Cyan Dispersion 14 | 8.3 |

TABLE 11-continued

| Component | % by Weight Ink 17 Invention |
|---|---|
| Deionised Water to Resistivity ohms/square | 100 1.68 × $10^7$ |

EXAMPLE 6

An inventive ink 3a was prepared exactly as described for ink 3 in Example 1 except that the fluorinated surfactant was omitted. The resulting ink has a surface tension of 58.5 dynes/cm suitable for printing on plain paper and a desirably low viscosity of 1.11 Cp.

Finally, variations from the examples given herein are possible in view of the above disclosure. Therefore, although the invention has been described with reference to certain preferred embodiments, it will be appreciated that other inks may be devised, which are nevertheless within the scope and spirit of the invention as defined in the claims appended hereto.

The foregoing description of various and preferred embodiments of the present invention has been provided for purpose of illustration only, and it is understood that the numerous modifications, variations and alterations may be made without departing from the scope and spirit of the invention as defined in the appended claims hereto.

What is claimed is:

1. An aqueous ink jet ink composition comprising:
   (a) a surface modified carbon black pigment;
   (b) at least one organic pigment; and
   (c) an aqueous carrier medium, wherein said medium consists essentially of water with substantially no organic cosolvent.

2. An aqueous ink jet ink composition according to claim 1 further comprising at least one dispersant.

3. An aqueous ink jet ink composition according to claim 2 wherein said dispersant is a styrene/acrylate copolymer.

4. An aqueous ink jet ink composition according to claim 3 wherein said styrene/acrylate copolymer has an acid number of between 150 and 250; a glass transition temperature between 70° C. and 100° C.; and a molecular weight of between 2000 and 20000.

5. An aqueous ink jet ink composition according to claim 1 wherein said surface modified carbon black pigment is modified by the incorporation of carboxylic or sulphonic acid groups.

6. An aqueous ink jet ink composition according to claim 1 wherein said surface modified carbon black pigment is modified by the incorporation of carboxylic acid groups.

7. An aqueous ink jet ink composition according to claim 1 wherein said organic pigment is selected from the group consisting of a blue pigment and a violet pigment.

8. An aqueous ink jet ink composition according to claim 1 wherein said organic pigment is selected from the group consisting of a Copper Phthalocyanine pigment, a dioxazine pigment, and an indanthrone pigment.

9. An aqueous ink jet composition according to claim 1 wherein said organic pigment is selected from the group consisting of C.I. Pigment Black 1; C.I. Pigment Yellow 1, 3, 12, 13, 14, 17, 24, 55, 74, 81, 83, 87, 95, 97, 98, 100, 101, 104, 108, 109, 110, 117, 120, 138, 151, 154, 155 and 180; C.I. Pigment Orange 5, 13, 16, 17, 36, 43, and 51; C.I. Pigment Red 1, 2, 3, 9, 17, 22, 23, 31, 38, 48:1, 48:2, 48:3, 48:4, 49:1, 52:2, 53:1, 57:1, 60:1, 63:1, 63:2, 64:1, 81, 83, 88, 112, 114, 122, 123, 146, 149, 166, 168, 170, 172, 177, 178, 179, 184, 188, 190, 202, and 209; C.I. Pigment Violet 1, 3, 5:1, 19, 23, 35, and 37; C.I. Pigment Blue 1, 2, 15:1, 15:2, 15:3, 15:4, 15:6, 16, 56, 60, 76, 79, and 80; and C.I. Pigment Green 1, 4, 7, 8, 10, and 36.

10. An aqueous ink jet ink composition according to claim 1 wherein said organic pigment is selected from the group consisting of C.I. Pigment Blue 15:1, 15:2, 15:3, 15:4, 15:6, 60, 61, 80, and C.I. Pigment Violet 23.

11. An aqueous ink jet ink composition according to claim 1 wherein said organic pigment is C.I. Pigment Blue 15:1.

12. An aqueous ink jet ink composition according to claim 1 wherein said organic pigment is C.I. Pigment Blue 60.

13. An aqueous ink jet ink composition according to claim 1 wherein said organic pigment is C.I. Pigment Violet 23.

14. An aqueous ink jet ink composition according to claim 1 wherein the ratio of said black pigment to said organic pigment is between 10:1 and 1:2, by weight.

15. An aqueous ink jet ink composition according to claim 1 wherein the ratio of said black pigment to said organic pigment is between 2:1 and 1:1, by weight.

16. An aqueous ink jet ink composition according to claim 1 wherein the average particle size of the pigment is from 0.005 to 10 µm.

17. A process for printing which comprises using an ink according to claim 1 in a continuous ink jet printer, and applying the ink to a printing medium with the ink jet printer.

* * * * *